Patented July 28, 1925.

1,547,526

UNITED STATES PATENT OFFICE.

PHILIP C. SCHERER, JR., OF MOUNT SINAI, NEW YORK.

AZODYESTUFFS FROM NITROSOCARBAZOL DISULPHONIC ACID AND A PRIMARY AMINO COMPOUND.

No Drawing.   Application filed January 15, 1925. Serial No. 2,683.

*To all whom it may concern:*

Be it known that I, PHILIP CARL SCHERER, Jr., a citizen of the United States, residing at Mount Sinai, in the county of Suffolk and State of New York, have invented certain new and useful Improvements in Azodyestuffs from Nitrosocarbazol Disulphonic Acid and a Primary Amino Compound.

This specification relates to a continuation in part of the process described in patent application #620,298 filed on February 20, 1923, in which dyestuffs were produced from carbazol by a new and original process. In this process carbazol was treated with concentrated sulfuric acid, the solution diluted and treated with sodium nitrite. The para nitroso carbazol disulfonic acid so formed was treated with 8 amino 1 naphthol 3:6 disulfonic acid. After neutralization the dyestuff was filtered and dried.

The above described process has since been applied to a large number of organic intermediates and dyestuffs obtained from carbazol as follows:

17 parts of carbazol are dissolved in 20–30 parts of concentrated sulfuric acid and raised to 100° C. for one half an hour. The carbazol disulfonic acid solution so formed is diluted with three times its volume of water, cooled, and 15–20 parts of sodium nitrate are slowly added with stirring and the para nitroso carbazol disulfonic acid is formed. Calculated quantities of primary aromatic amino compounds in solution may then be combined with the solution of para nitroso carbazol disulfonic acid to form dyestuffs according to the following reaction where R is an aryl radical $$C_{12}H_5 \cdot NH \cdot (SO_3H)_2 \cdot N:O + H_2NR \rightarrow$$
p nitroso carbazol disulfonic acid   aromatic amine
$$H_2O + C_{12}H_5 - NH(SO_3H)_2 - N = NR$$
dyestuff This reaction is characteristic of large numbers of primary aromatic amino compounds and takes place as follows: The oxygen of the nitroso group in the para-nitroso carbazoldisulfonic acid unites with the two hydrogen atoms of the amino group of the primary aromatic amino compound to form water, and the two radicals—carbazol and the amine—are united by means of an N=N (azo) group and give rise to colored compounds. This reaction was carried out on the union of the following representative aromatic amino intermediates with carbazol nitroso disulfonic acid with the results as follows:

| Intermediate | Dyestuff color | Dyes silk or wool |
|---|---|---|
| Benzidine | Red brown | Yellow. |
| Sulphanilic acid | Red | Red yellow. |
| m-phenylenediamine | Brown | Red brown. |
| p-nitroaniline | Red | Golden brown. |
| Naphthylamine | Dark brown | Dark brown. |
| Toluidine | Deep red | Bright yellow. |
| Aminoazobenzene | Red | Red brown. |
| Dianisidine | Dark brown | Yellow brown. |
| p-amino acetanilide | Red | Green yellow. |
| p-toluidine | Yellow | Green yellow. |
| 8 amino 1-naphthol 3:5 disulfonic acid | Brown | Violet. |

Aniline, amino phenols, amino benzoic acid, and the amino naphthalene sulfonic acids also gave evidence of color formation but were not exhaustively investigated.

I claim:—

A process of producing azodyestuffs by combining an aromatic primary amino compound with a nitroso carbazol disulphonic acid produced by treating carbazol disulphonic acid with nitrous acid.

In witness whereof, I subscribe my signature.

PHILIP C. SCHERER, JR.